S. BARUCH.
ANTISKIDDING DEVICE FOR VEHICLE WHEELS.
APPLICATION FILED DEC. 16, 1915.
1,195,640.
Patented Aug. 22, 1916.
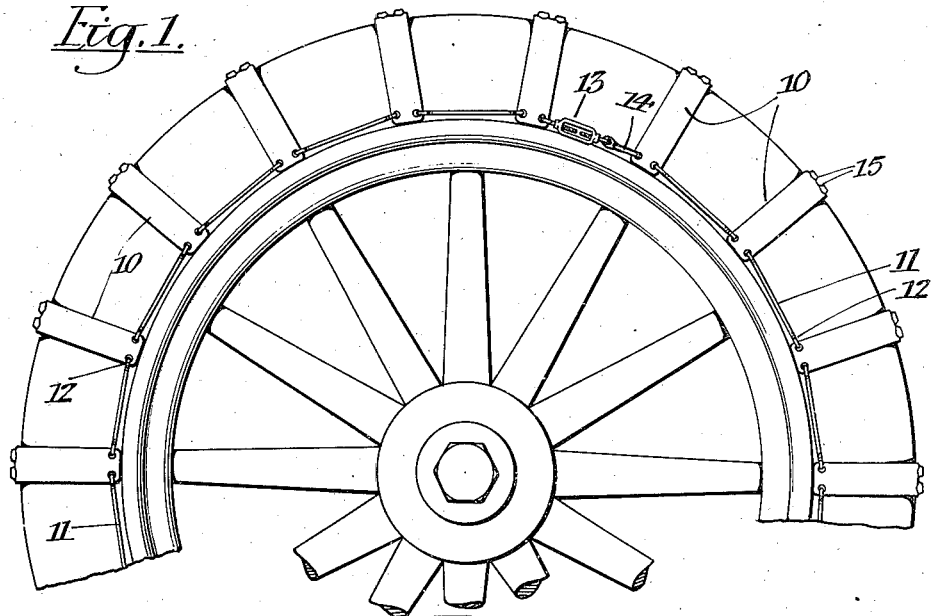
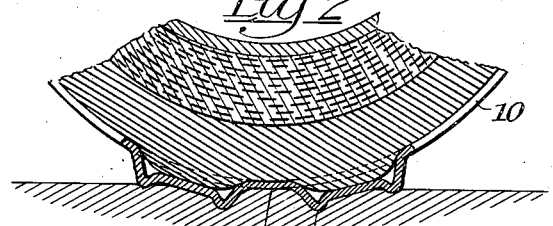
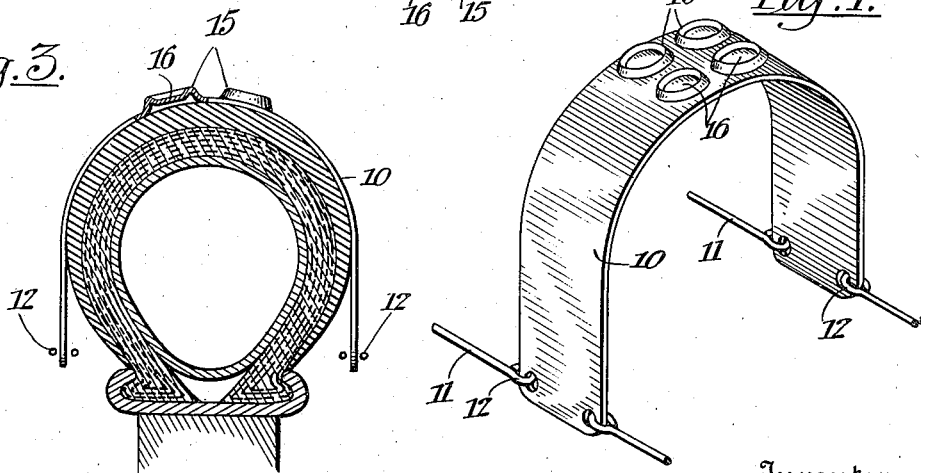

UNITED STATES PATENT OFFICE.

SAMUEL BARUCH, OF NEW YORK, N. Y.

ANTISKIDDING DEVICE FOR VEHICLE-WHEELS.

1,195,640. Specification of Letters Patent. Patented Aug. 22, 1916.

Application filed December 16, 1915. Serial No. 67,094.

*To all whom it may concern:*

Be it known that I, SAMUEL BARUCH, a citizen of the United States, and resident of New York, borough of Brooklyn, in the county of Kings and State of New York, have invented certain new and useful Improvements in Antiskidding Devices for Vehicle-Wheels, of which the following is a specification.

This invention relates to certain improvements in anti-skidding devices for vehicle wheels and more particularly to that type in which separate, relatively movable cleats are detachably secured to the tire, each cleat extending transversely of the tread portion of the tire so as to present a gripping surface to prevent the tire from slipping.

The main feature of my invention involves a novel form of tread portion for these cleats which will more effectively act upon the ground, pavement or other supporting surface and on the tire itself.

In its preferred form, my invention involves a series of transversely extending sheet metal strips, stamped or embossed along the tread portion so as to present a series of cup-shaped depressions partially receiving both the supporting surface and the tread of the tire.

Reference is to be had to the accompanying drawing in which similar reference characters indicate corresponding parts in the several views.

In these drawings, Figure 1 is a side elevation of a portion of a wheel provided with an anti-skidding device constructed in accordance with my invention, Fig. 2 is an enlarged transverse section through a portion of one cleat, adjacent parts of the supporting surface and a portion of the tire, Fig. 3 is a transverse section through the tire with the device in place, a portion of one cleat being broken away, and Fig. 4 is a perspective view of one section of the device.

In the specific form illustrated in the accompanying drawings, my improved device includes a series of transversely extending cleats each formed of a strip 10 of sheet metal bent to substantially U-shape. Each strip is of such a length that it may extend from a point approximately opposite to one side of the rim out around the tire and back to a point approximately opposite the other side of the rim. The strip may be made considerably longer or shorter than those shown in the drawing as the specific length is not material so long as the strips extend down along the sides sufficiently far to prevent the device from accidentally slipping laterally off of the tire.

The strips may be made of various different widths although a strip made too narrow is liable to cut into the tire and a strip made too wide will not properly fit the tire. Any suitable mean between these extremes is satisfactory. The edges of the strips are rounded or may even be curved outward slightly so as not to cut into the rubber. Each strip is connected to the adjacent strips at both ends by a series of links, which, by reason of the fact that they are closer to the hub than is the periphery of the tire, effectively hold the strips in position. These links may be formed in various different ways but an extremely simple and satisfactory form is that illustrated.

I have shown each link in the form of a heavy wire or rod 11 bent at each end to form a ring or hook 12 engaging with an aperture in the corner of the strip. Each strip is connected to the ends of the adjacent strip by two of these links which come on opposite sides of the rim or tire and the two series of links, together with the extremities of the links, form two substantially continuous metal retainers.

To facilitate the attachment or detachment of the device to a tire, certain of the links may be so constructed as to be readily disengaged from the adjacent strip or any suitable form of fastener may be employed. Preferably there are one or more turnbuckles 13 employed as links for tightening the device and accommodating for variations in the size of the tire and each turnbuckle may have a hook 14 at one end to facilitate the opening up and removal of the device.

As the most important feature of my invention, I provide the tread portion of each strip with one or more cup-shaped irregularities serving as gripping portions. As shown, a circular portion of the metal is stamped outwardly, the center of this being displaced to a lesser degree than the peripheral portion. Thus, there is formed an annular ridge 15 encircling a disk 16 which latter is normally spaced from the surface of the tire as it lies out beyond the normal plane of the adjacent portion of the strip 10. Thus, the outer surface of the strip presents a series of cup-shaped depressions encircled by the annular ridges 15, and the inner surface also presents a series of cup-shaped depressions.

When the device is tightly clamped to the tire and when one of the strips comes beneath the tire during the rotation of the wheel, the rubber or other composition of the tire can enter into the cup-shaped depressions of the inner surface of the strip and the ground, pavement or other supporting surface may enter into the cup-shaped depressions in the outer surface of the strip. Thus, the strip is prevented from slipping in regard to the ground and the tire is prevented from slipping within the strip. The suction of these shallow cups is found to be very effective and at the same time they do not act to cut or injure either the tire or the road-bed.

The annular ridges 15 serve to protect the body portion of the strip to a certain extent against wear and thus the strips, although formed of metal sufficiently thin to be flexible, do not readily become worn out. Even though the metal be worn through along the annular ridges so that the center portions or disks 16 drop out, yet this does not prevent the device from acting effectively to prevent skidding or slipping. Under such a condition, the road-bed and tire surface could both slightly enter the aperture in the street and relative, lateral or skidding motion would be prevented or at least effectively resisted.

I have illustrated each strip as being provided with four of these double or compound suction cups or depressions but this particular number is not an essential as a greater or lesser number might be employed. In fact, I might, under some circumstances, use only one and make it considerably larger in diameter and depth than that shown. The material forming these strips is sufficiently thick to resist ordinary tendencies to bend to any appreciable extent when the device is removed from the tire, but is sufficiently flexible to accommodate itself to the shape of the tire and flatten out with the portion of the tire supporting the load as the wheel rotates. The material is preferably elastic so as to normally have a predetermined form although I might, under some conditions, employ annealed metal. The strips are shown of uniform thickness although in practice I may make the tread portion materially thicker than the side portions and may make the tread portion of a different character and strength of material and welded to the flat terminal portions lying at the sides of the tire. In fact these terminal portions might be of other material than metal such for instance as leather, canvas, or the like.

Having thus described my invention, what I claim as new and desire to secure by Letters Patent is:

1. An anti-skidding device for vehicle wheels including a plurality of substantially U-shaped sheet metal strips, each receiving the tire, each of said strips having the tread portion thereof deformed to present outwardly and inwardly facing cup-shaped depressions.

2. An anti-skidding device for vehicle wheels, including a plurality of substantially U-shaped sheet metal strips each receiving the tire and each having the tread portion thereof deformed to present an outwardly extending annular projection, the portion of the strip encircled by said projection being displaced outwardly in respect to the adjacent body portion of the strip.

Signed at New York, in the county of New York and State of New York, this 15th day of December, A. D. 1915.

SAMUEL BARUCH.

Witness:
FLORENCE LEVIEN.